US012365078B2

(12) United States Patent
Greitmann et al.

(10) Patent No.: US 12,365,078 B2
(45) Date of Patent: Jul. 22, 2025

(54) POWER TOOL HAVING AN AIR COOLING SYSTEM ANDMETHOD FOR COOLING COMPONENTS OF A POWER TOOL

(71) Applicant: Hilti Aktiengesellschaft, Schaan (LI)

(72) Inventors: Ralf Greitmann, Kaufering (DE); Roland Meuer, Ettringen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/039,431

(22) PCT Filed: Nov. 17, 2021

(86) PCT No.: PCT/EP2021/081927
§ 371 (c)(1),
(2) Date: May 30, 2023

(87) PCT Pub. No.: WO2022/117336
PCT Pub. Date: Jun. 9, 2022

(65) Prior Publication Data

US 2023/0415324 A1 Dec. 28, 2023

(30) Foreign Application Priority Data

Dec. 4, 2020 (EP) .................................... 20211896

(51) Int. Cl.
*B25F 5/00* (2006.01)
*B24B 23/02* (2006.01)

(52) U.S. Cl.
CPC .............. *B25F 5/008* (2013.01); *B24B 23/02* (2013.01)

(58) Field of Classification Search
CPC ................................ B25F 5/008; B24B 23/02
See application file for complete search history.

(56) References Cited

U.S. PATENT DOCUMENTS 3,949,817 A 4/1976 Rice
5,016,355 A 5/1991 Gassen et al.
(Continued)

FOREIGN PATENT DOCUMENTS

CN 1584339 A 2/2005
CN 103946767 A 7/2014
(Continued)

OTHER PUBLICATIONS

International Search Report of PCT/EP2021/081926 dated Feb. 1, 2022.
(Continued)

*Primary Examiner* — Eyamindae C Jallow
(74) *Attorney, Agent, or Firm* — Davidson Kappel LLC

(57) ABSTRACT

A power tool having an air cooling system. A special air guidance system is proposed, the components of the power tool, such as a motor, transmission or electronics of the power tool, can be supplied in a particularly efficient manner with a cooling air flow around them and in this way can be cooled. In this case, the cooling system should, in particular, be independent of any components of the housing of the power tool since the air guidance is advantageously brought about by internal guidance processes, wherein these internal guidance processes preferably take place independently of components of the housing of the power tool. In particular, the housing-independent air cooling of the components of the power tool is achieved by the provision of a fan on a rotor of the motor of the power tool, which is designed, by means of a reduced pressure, to produce a cooling air flow and guide it in a suitable manner through the power tool. In a second aspect, the invention relates to a method for cooling components of a power tool.

23 Claims, 6 Drawing Sheets

(56) References Cited

U.S. PATENT DOCUMENTS

| | | | | |
|---|---|---|---|---|
| 5,099,160 | A | 3/1992 | Stroezel et al. | |
| 5,960,549 | A | 10/1999 | Hoeppner et al. | |
| 2002/0062967 | A1* | 5/2002 | Ziegler | B25D 16/003 173/216 |
| 2004/0098869 | A1 | 5/2004 | Ashfield | |
| 2005/0042082 | A1 | 2/2005 | Tamagawa et al. | |
| 2011/0198103 | A1 | 8/2011 | Suzuki et al. | |
| 2011/0284256 | A1 | 11/2011 | Iwata et al. | |
| 2013/0098647 | A1 | 4/2013 | Martinsson et al. | |
| 2014/0254097 | A1 | 9/2014 | Kohn | |
| 2015/0343617 | A1* | 12/2015 | Kondo | B25B 21/02 173/93 |
| 2017/0239804 | A1 | 8/2017 | Matsushita et al. | |
| 2018/0154508 | A1* | 6/2018 | Roehm | B25F 5/001 |
| 2018/0361562 | A1 | 12/2018 | Baxivanelis et al. | |
| 2019/0006909 | A1* | 1/2019 | Nagahama | H02K 11/21 |
| 2019/0348887 | A1* | 11/2019 | Kuehne | F16H 57/029 |
| 2020/0280243 | A1* | 9/2020 | Beyerl | H02K 29/08 |
| 2020/0313512 | A1* | 10/2020 | Beyerl | B25B 21/00 |
| 2022/0176511 | A1 | 6/2022 | Greitmann et al. | |

FOREIGN PATENT DOCUMENTS

| | | | |
|---|---|---|---|
| DE | 7406974 | U | 10/1974 |
| DE | 8226112 | U1 | 11/1982 |
| DE | 102014009311 | A | 12/2015 |
| DE | 102016106559 | A1 | 10/2017 |
| EP | 3181305 | A1 | 6/2017 |
| EP | 3733352 | A1 | 11/2020 |
| JP | 2007196363 | A | 8/2007 |
| JP | 2011240441 | A | 12/2011 |
| JP | 6402777 | B2 | 10/2018 |
| JP | 2019217590 | A | 12/2019 |
| WO | WO9000828 | A1 | 1/1990 |
| WO | WO 2020221471 | A1 | 11/2020 |
| WO | WO2022/117335 | A1 | 6/2022 |
| WO | WO 2022/117336 | A1 | 6/2022 |
| WO | WO 2022/117337 | | 6/2022 |

OTHER PUBLICATIONS

International Search Report of PCT/EP2021/081927 dated Feb. 25, 2022.

International Search Report of PCT/EP2021/081928 dated Feb. 23, 2022.

* cited by examiner

POWER TOOL HAVING AN AIR COOLING SYSTEM ANDMETHOD FOR COOLING COMPONENTS OF A POWER TOOL

The present invention relates to a power tool having an air cooling system.

BACKGROUND

In the power tool sector, cut-off grinders or angle grinders by means of which cuts can be made in a substrate to be machined or which can be used to machine the surface of a substrate are known. Such cut-off or angle grinders generally have a disk-shaped tool, which is referred to as a cutting or grinding disk.

Increases in the available capacity of rechargeable batteries have seen the increasing commercial introduction of battery- or rechargeable-battery-driven cut-off grinders with cutting disks and blade diameters greater than 230 mm; especially for applications in which gasoline-powered cut-off grinders have been used hitherto. Such power tools are preferably referred to for the purposes of the invention as "battery-operated cut-off or angle grinders". These power tools are generally cooled by means of an air flow.

SUMMARY OF THE INVENTION

Depending on the type of power tool, components of the power tool, such as a motor, electronics, a transmission or a tool, are cooled by means of the air flow. For air guidance, components of the housing are usually used. In the case of existing power tools, the air guidance or cooling system is thus often a component of housing parts. However, the housing parts also have further tasks, such as robustness, appearance, ergonomics and protection for the user and for the interior of the power tool. In the embodiment of housing parts, compromises are often made between function, structure and design, with the result that power tools with non-optimal air guidance and/or air cooling are provided.

It is therefore an object of the present invention to overcome the above-described defects and disadvantages of the prior art and to make available a power tool and a cooling method for components in a power tool in which optimized air cooling is provided. Moreover, the air cooling system should be of particularly simple construction and should contribute to a robust and compact construction of the power tool.

In working with a power tool, e.g. when cutting off with a battery-powered cut-off grinder, dust, sludge and/or metal chips may be formed, or small stones may be thrown up. Particles may penetrate in an unwanted manner into the power tool via the air cooling system and reduce the service life of components. It is therefore a further object of the present invention to make available a power tool and a cooling method for components in a power tool in which the penetration of particles into the power tool via the air cooling system can be avoided in an effective manner. In other words, the internal components of the power tool, such as electronics, a connector or a motor, are protected as well as possible from dust, sludge and other particles.

According to the invention, a power tool having an air cooling system is provided. In particular, the power tool is characterized in that it comprises a fan for cooling components of the power tool, wherein the power tool comprises a) a carrier unit with electronics, b) a motor connector, c) a motor having a stator and a rotor, and d) a motor housing as components, wherein the fan is arranged on the rotor of the motor and is designed to produce a reduced pressure in such a way that an air flow produced by the reduced pressure cools the components of the power tool.

In one exemplary embodiment, the invention comprises, in particular, an air-cooled battery-operated cut-off grinder having a brushless motor. It is a basic concept underlying the invention that a special air guidance system, by means of which particularly effective and efficient cooling of the components of the power tool can be achieved, is made available within the power tool. In this case, the air flow is produced, in particular, by a fan, wherein the fan is preferably driven by the rotor shaft of the motor of the power tool.

The invention proposes a special air guidance system within a power tool, by means of which the components of the power tool, such as a motor, transmission or electronics of the power tool, can be supplied in a particularly efficient manner with a cooling air flow around them and in this way can be cooled. In this case, the cooling system is designed, in particular, to be independent of any components of the housing of the power tool since the air guidance is advantageously brought about by internal guidance processes, wherein these internal guidance processes preferably take place independently of components of the housing of the power tool. In particular, the housing-independent air cooling of the components of the power tool is achieved by the provision of a fan on a rotor of the motor of the power tool, which is designed, with the aid of a reduced pressure, to produce a cooling air flow and guide it in a suitable manner through the power tool. For the purposes of the invention, it is preferred that the air cooling system of the power tool is designed to be independent of any components of the housing of the power tool. It is thereby possible to provide a particularly simple and robust construction of a main body of the power tool.

For the purposes of the invention, it is preferred that the air flow produced by the fan cools the components of the power tool in the sequence a) to d) of their occurrence above. In other words, the invention relates to a power tool having an air cooling device, wherein the power tool comprises a fan for cooling components of the power tool, wherein the power tool comprises a carrier unit for electronics and for the battery interfaces, a motor connector, a motor having a stator and a rotor, and a motor housing as components, wherein the fan is arranged on the rotor of the motor and is designed to produce a reduced pressure in such a way that the air flow produced by the reduced pressure cools the components of the power tool in the sequence in which they have been listed. For the purposes of the invention, the fan is preferably designed to produce an air flow in such a way that the components of the power tool are cooled in the sequence a) to d). For the purposes of the invention, this preferably means that the electronics in the carrier unit are cooled first, then the motor connector, then the motor, in particular the stator of the motor, and then the motor housing, which preferably comprises a cutting arm and a transmission of the power tool.

The cooling of the components in this sequence is advantageous because in this way the air flow first cools those components which have the greatest cooling requirement, namely the electronics. The air flow then cools the motor and flows past the transmission housing as it is expelled. For the functioning and service life of the power tool, it is advantageous if any particles can first settle on the heat sinks of the electronics, said heat sinks preferably being of passive design, before they reach the rotating rotor and possibly cause bearing damage, rotor jamming or the like there.

For the purposes of the invention, it is preferred that the motor of the power tool is a brushless motor. A brushless motor is advantageously used because of its high efficiency and because of the service life which brushless motors have owing to the contactless commutation.

For the purposes of the invention, it is preferred that the motor connector causes a deflection of the air flow through about 90 degrees. The phrase "about 90 degrees" is not an unclear concept for a person skilled in the art because a person skilled in the art knows that the phrase "about 90 degrees" or "substantially 90 degrees" refers to a substantially right angle which can deviate—owing to production conditions, for example—by 1 to 5 degrees from exact mathematical rectangularity.

The motor connector is designed to connect the electronics of the power tool to the stator of the motor by means of contact points and leads. For the purposes of the invention, it is preferred that the electronics control the motor during operation. For this purpose, a defined current flow to the stator is preferably used. The electronics are preferably designed to control the commutation of the motor and/or the drive of the rotor.

In a preferred embodiment of the invention, the housing of the motor connector serves on the inside as an air guide with deflection of the cooling air flow by about 90 degrees and on the outside as a cable guide for the leads which connect the motor to the electronics. For the purposes of the invention, these are preferably also referred to as "motor leads". The motor leads are preferably designed to transmit data and/or control commands from the electronics to the motor.

Tests have shown that the penetration of particles into the power tool via the air cooling system can be avoided in an effective manner in the power tool. In particular, the internal components of the power tool, such as electronics, a connector or a motor, are protected in a particularly effective manner from dust, sludge and other particles.

For the purposes of the invention, it is preferred that the power tool has two rechargeable batteries. These rechargeable batteries can each be arranged in a respective receiving space in a rear, lower region in the main body of the power tool. The power tool can comprise a rear region, which is formed by a main body and a protection frame, for example. The main body of the power tool can be surrounded by a housing, and can comprise a control unit, a drive or drive train and/or a motor. The protection frame can comprise a front, circumferential handle and a second, upper handle. The front part of the power tool is formed by the tool thereof, which, particularly in the case where the power tool is designed as a cut-off grinder, is a disk-shaped tool. In particular, it may be referred to as a cutting disk. For the purposes of the invention, it is preferred that the spatial directions of "front" and "rear" are defined by the front power tool region formed by the tool and by the rear power tool region formed inter alia by the main body. The spatial regions "top" and "bottom" or "upper side" and "underside" of the power tool are preferably defined by the upper handle ("upper side"), which, for the purposes of the invention, is also preferably referred to as the second handle, and by the protection frame, the underside of which preferably extends on the underside of the power tool.

For the purposes of the invention, it is preferred that the power tool comprises a first, circumferential handle, a second, upper handle, and a protection frame for protecting the main body of the power tool. Details of these components of the power tool can be found, in particular, in the figures. The first, circumferential handle preferably extends in the region of the transition between the front and the rear region of the power tool and is normally gripped with the left hand by a right-handed person. To this extent, the first, circumferential handle can also be used for carrying the power tool. The circumferential configuration of the first handle means that the first handle provides effective impact protection at the sides of the power tool, especially if the power tool were to fall on the right-hand or left-hand side of the tool when dropped. In particular, the circumferential configuration of the first handle protects the power tool components arranged in the main body of the power tool, such as the motor, drive or transmission, but also, of course, the rechargeable batteries. For the purposes of the invention, it is preferred that a plane, in which the first handle predominantly extends, extends substantially orthogonally to a longitudinal axis of the power tool. In particular, the longitudinal axis, which can be laid virtually through the power tool, extends centrally through the power tool and extends from the front region of the power tool in the direction of the rear region thereof. For the purposes of the invention, it is preferred that the plane in which the first handle predominantly extends is substantially perpendicular to the longitudinal axis of the power tool.

The second, upper handle preferably extends substantially parallel to the virtual longitudinal axis of the power tool and is normally gripped with the right hand by a right-handed person. For the purposes of the invention, it is preferred that the upper handle projects beyond the main body of the power tool in a rearward spatial direction, thus ensuring that the main body and the internal components thereof are well protected against a fall and landing of the power tool on a rear side of the power tool. For the purposes of the invention, the term "overlap" preferably describes the distance between a substantially vertical rear wall of the main body of the power tool and a point on the rear part of the upper handle which is furthest away. This distance or overlap is in a range of from 1 to 12 cm, preferably 3 to 9 cm, and particularly preferably about 6 cm, for example.

For the purposes of the invention, it is preferred that the second handle is arranged above the electronics of the power tool and, on its upper side and/or its underside, comprises operating switches for the power tool. Owing to the fact that the second handle of the power tool is normally gripped by the right hand of a user, the power tool can be operated particularly well by providing the operating switch on the upper side and/or the underside of the second handle. By virtue of the preferred spatial proximity between the electronics of the power tool and the at least one operating switch in the second handle, transfer paths for control commands can be considerably shortened, and the cabling and circuitry within the power tool can be simplified.

For the purposes of the invention, it is preferred that a carrier unit of the power tool has at least one interface for a rechargeable battery. For the purposes of the invention, it is preferred that the rechargeable batteries comprise contacts, by means of which they can be plugged in on the power tool. For this purpose, the power tool comprises a corresponding connection arrangement, with which the contacts of the rechargeable batteries can interact. The power tool preferably comprises an interface, by means of which the energy supply to the power tool and the energy discharge of the rechargeable batteries can be controlled. For the purposes of the invention, there may be a preference for the power tool to comprise an interface which controls the energy discharge from both rechargeable batteries. However, there may likewise be a preference for the power tool to comprise two interfaces, i.e. one interface for each rechargeable battery.

For the purposes of the invention, there is a particular preference that the rechargeable batteries are connectable to electronics of the power tool via an interface and contacts. In other words, there may be a preference for the purposes of the invention that the rechargeable batteries are connectable to electronics of the power tool via an interface and contacts.

In addition, the carrier unit can comprise electronics for the power tool. The electronics of the power tool can comprise a control unit, by means of which the operation of the power tool is controlled. For the purposes of the invention, it is preferred that the electronics of the power tool have heat sinks.

For the purposes of the invention, it is preferred that the electronics can be installed in a suspended manner within the power tool. In other words, the electronics are installed in a suspended manner in the power tool or the main body thereof. By virtue of the preferably suspended installation of the electronics within the power tool, it is advantageously possible to prevent deposits of dirt and/or dust particles or sludge from forming. The installation of the electronics in the carrier unit is chosen in such a way that only the heat sink comes into contact with the air flow. In this way, optimum cooling of the electronics is achieved and deposits on contacts, e.g. connectors or the like, are avoided. Experience shows that particles are generally deposited from the air flow on the front side of the heat sink, as a result of which the cooling of the electronics is influenced only to a slight extent. The electronics are preferably installed in a manner rotated by 180° within the power tool, with the electronics tray facing upward.

For the purposes of the invention, it is preferred that the power tool has air inlets for sucking in air, wherein the air inlets are arranged on a rear side of a main body of the power tool. The position of the air inlets is illustrated, in particular, in FIG. 1. In particular, the air inlets can be regarded as components of the carrier unit, wherein the air is sucked into the carrier unit above the rechargeable batteries. This suction arises, in particular, from the reduced pressure produced by the fan which is arranged in the region of the rotor of the motor of the power tool.

The term "air" is not an unclear concept for a person skilled in the art because they know that it refers to the gaseous oxygen-nitrogen mixture of which the atmosphere of the earth is substantially composed. For the purposes of the invention, it is preferred that a flow of such air is sucked in from the environment of the power tool through the air inlets and used to cool the components within the power tool or the main body thereof.

For the purposes of the invention, it is preferred that the power tool comprises a first air inlet, which is arranged above a first rechargeable battery, and a second air inlet, which is arranged above a second rechargeable battery. The air inlets are preferably situated on different sides of the second handle of the power tool. In other words, the air inlets can be situated on a right-hand and a left-hand side of the second handle of the power tool. This preferably bilateral arrangement of the at least two air inlets in relation to the second handle on the rear side of the power tool is likewise illustrated in FIG. 1.

For the purposes of the invention, it is preferred that domes are provided in the region of the air inlet in order to protect the air inlets from penetration of relatively large dust particles. Through the provision of the domes, the internal components of the power tool can be protected particularly well from those particles which penetrate into the interior of the power tool or the main body thereof together with the air flow sucked in through the air inlet. The domes are preferably designed to block the path of relatively large particles through the air inlets, thus ensuring that they are prevented from the outset from getting into the interior of the power tool or the main body thereof.

For the purposes of the invention, it is preferred that the air inlets are as far as possible away from a working region of the power tool. Tests have shown that it is a significant advantage of the invention that the air inlets are arranged as far as possible away from the location at which the working or cutting process of the power tool takes place. For the purposes of the invention, the location at which the working or cutting process of the power tool takes place is preferably also referred to as the working region of the power tool.

For the purposes of the invention, it is preferred that the power tool has an air outlet which is arranged in the region of a transmission of the power tool. By providing the air outlet in spatial proximity to the transmission of the power tool, it is advantageously also possible to provide cooling for the transmission. In particular, cooling of the transmission is made possible by the outflowing air which has previously cooled the components of the power tool.

For the purposes of the invention, it is preferred that the at least one air outlet is designed as a lateral air outlet and is arranged on a right-hand or left-hand side of the power tool. The at least one air outlet is preferably arranged on the side of the power tool on which the cutting arm of the power tool is situated. The cutting arm is preferably part of the motor housing, from which it extends in the direction of the preferably disk-shaped tool of the power tool. Moreover, the air outlet is preferably not situated on the side of the power tool on which the user of the power tool stands when using said power tool. As a result, the air flow flowing out of the power tool is not directed at the user, thus preventing an unpleasant blast of air on the user. Furthermore, by virtue of its lateral arrangement on the side of the power tool facing away from the user, the air flow flowing out of the power tool is also not directed at the working region of the power tool. This avoids a situation where dust is whipped up and can then get into the airways of the user during the operation of the power tool. For the purposes of the invention, it is preferred that cooling of the transmission of the power tool can be effected by the outflowing air. In particular, by virtue of the arrangement of the at least one air outlet, the outflowing air is not blown into a working region of the power tool. It is thereby possible in an effective manner to prevent additional whipping up of dust.

For the purposes of the invention, it is preferred that the rotor of the motor has an enclosure for protection against dust. By means of the enclosure, the rotor and thus the moving part of the motor is particularly well protected from dust, thereby making it possible to considerably lengthen its life, as tests have shown. In particular, it is possible by means of the enclosure of the rotor to achieve preferably hermetic isolation of the rotor, thus ensuring that dust ingress in the direction of the driving parts of the rotor can be avoided in a particularly effective manner.

For the purposes of the invention, it is preferred that a central carrier, which is preferably also referred to as a carrier unit, is arranged within the main body of the power tool. This carrier unit is preferably manufactured from plastic or comprises one or more plastics. As a result, the carrier unit can, on the one hand, be of very stable design and, on the other hand, of particularly light design, and therefore it contributes only insignificantly to the overall weight of the power tool. For the purposes of the invention, it is preferred that the carrier unit is connected in a fixed manner to the motor housing and is designed to receive the electronics, the interfaces, the contacts, the rechargeable batteries and/or the damping elements. For the purposes of the invention, it is preferred that the carrier provides an internal structure for the main body of the power tool, wherein the components of the power tool which are provided within the main body can be fastened to the carrier unit. For the purposes of the invention, it is preferred that the protection frame and the upper handle can also be fastened to the carrier unit. The housing of the power tool can preferably consist of two housing shells, which can likewise be mounted on the carrier unit.

For the purposes of the invention, it is preferred that the carrier, together with the motor housing, forms a central component for guiding air for cooling. For the purposes of the invention, it is preferred that the electronics of the power tool is mounted in a suspended manner in or on the carrier unit in order to avoid deposits of dust and/or water in an effective manner. The carrier unit can comprise a heat sink for cooling the electronics, wherein an air flow can be guided through the carrier to cool the electronics. For the purposes of the invention, it is preferred that the carrier unit slopes downward toward the rear at a slope angle, wherein this slope angle of the carrier unit is greater than 3 degrees, preferably greater than 5 degrees. For the purposes of the invention, it is preferred that the slope angle is formed between an imaginary ground plane on which the power tool can be set down and a plane which extends centrally through the carrier unit of the power tool. Despite the sloping design of the carrier unit, there is a preference for the purposes of the invention for the interfaces and contacts for connecting the power tool to the rechargeable batteries to be of substantially horizontal design. The rechargeable batteries are preferably also oriented substantially horizontally within the power tool. For the purposes of the invention, the term "substantially horizontal" preferably means that said components do not slope in the power tool, that is to say that any straight line or plane passing through them encloses an angle of substantially 0 degrees with an imaginary ground plane. In other words, an imaginary straight line or plane passes through the interfaces, contact surfaces and/or rechargeable batteries substantially parallel to an imaginary ground plane.

For the purposes of the invention, it is preferred that the rechargeable batteries comprise contacts, by means of which they can be plugged in on the power tool. For this purpose, the power tool comprises a corresponding connection arrangement, with which the contacts of the rechargeable batteries can interact. The power tool preferably comprises an interface, by means of which the energy supply to the power tool and the energy discharge of the rechargeable batteries can be controlled. For the purposes of the invention, there may be a preference for the power tool to comprise an interface which controls the energy discharge from both rechargeable batteries. However, there may likewise be a preference for the power tool to comprise two interfaces, i.e. one interface for each rechargeable battery. For the purposes of the invention, there is a particular preference that the rechargeable batteries are connectable to electronics of the power tool via an interface and contacts.

In a second aspect, the invention relates to a method for cooling components of a power tool. The definitions, technical advantages and effects that have been described for the power tool preferably apply analogously to the cooling method. In particular, the cooling method is characterized by the following method steps.

a) providing the power tool having a fan, wherein the power tool comprises
   i) a carrier unit,
   ii) a motor connector,
   iii) a motor having a stator and a rotor, and
   iv) a motor housing as components,
   wherein the fan of the power tool is arranged on the rotor of the motor,
b) producing a reduced pressure by means of the fan, thereby causing an air flow within the power tool,
c) cooling the components of the power tool by means of the air flow produced in method step b).

In the context of the method, a power tool having a fan and the components mentioned, namely at least one carrier unit, a motor connector, a motor and the motor housing, is made available. The motor of the power tool is preferably a brushless electric motor, which has a rotor as a moving part and a stator as a stationary part. The fan of the power tool is arranged on the rotor of the motor and is designed to produce a reduced pressure, which is preferably the cause of an air flow within the power tool. In the context of the invention, this air flow which is produced by the fan is used to cool the components of the power tool, in particular by virtue of the fact that it is guided past the components of the power tool.

For the purposes of the invention, it is preferred that the cooling of the components of the power tool takes place in the sequence i) to iv), i.e. preferably in the sequence as stated in the description of the method. For the purposes of the invention, there is a particular preference that the components of the power tool are cooled in the sequence i) to iv), more specifically preferably by a cooling air flow produced by a reduced pressure. This reduced pressure is preferably produced by a fan, which is arranged on the rotor of the motor of the power tool. The cooling air flow allows cooling of the power tool which is advantageously independent of parts of the housing of the power tool. In particular, the air flow within the power tool is not guided by housing parts of the power tool but by the carrier unit with electronics, the motor connector, the motor and the motor housing with an integrated transmission.

In one exemplary embodiment of the invention, the solution provides a power tool, wherein the power tool has a fan which is fixed on the rotor. The fan produces a reduced pressure, with the result that an air flow for cooling the components of the power tool is produced. The air guidance is optimized to such an extent that the following subassemblies can be cooled in this sequence with the air flow produced by the fan:

1. carrier unit, wherein the carrier unit can have electronics and/or a battery interface,
2. motor connector, at which a deflection of the air flow by about 90 degrees is brought about,
3. motor having a stator and a rotor,
4. motor housing having a cutting arm and a transmission.

The air guidance or cooling of the power tool is advantageously independent of the housing parts. The power tool or its air cooling device or the carrier unit can have air inlets which are designed to suck in air, wherein the air sucked in forms an air flow for cooling the components of the power tool. The air inlets are preferably situated on a rear side of a main body of the power tool. For the purposes of the invention, it is preferred that the power tool comprises a first air inlet, which is arranged above a first rechargeable battery, and a second air inlet, which is arranged above a second rechargeable battery. For the purposes of the invention, it is preferred that the air inlets are situated on a right-hand and a left-hand side of the second handle of the power tool. In addition, the air inlets can have domes on the carrier unit in order to protect the air inlets from penetration of dirt and/or dust particles. Moreover, the power tool can have an air outlet which is arranged in the region of a transmission of the power tool. The electronics, which are preferably arranged on the carrier unit, can have heat sinks and are preferably installed in a suspended manner. It is thereby possible, in particular, to prevent deposition of particles or sludge.

BRIEF DESCRIPTION OF THE DRAWINGS

Further advantages will become apparent from the following description of the figures. The figures, the description and the claims contain numerous features in combination. A person skilled in the art will expediently also consider the features individually and combine them to form useful further combinations.

Identical and similar components are denoted by the same reference signs in the figures, In the figures.

DETAILED DESCRIPTION

Figure 1:
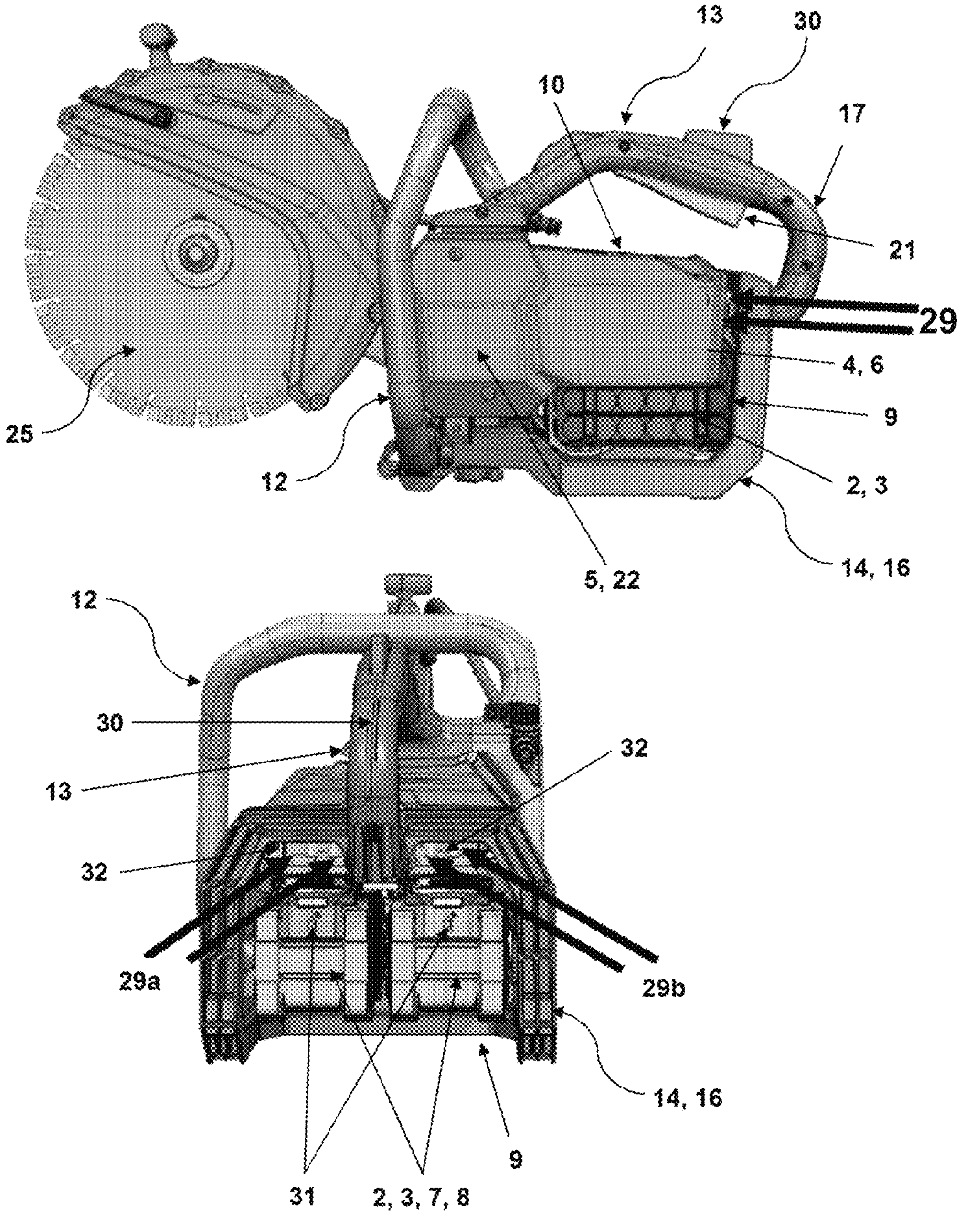
FIG. 1 shows a side and rear view of a preferred configuration of power tool

In an upper region, FIG. 1 shows a side view of a preferred embodiment of the power tool 1 and, in a lower region, shows a rear view of a preferred embodiment of the power tool 1. In particular, FIG. 1 shows a power tool 1 which is designed as a cut-off grinder and has a cutting disk 25 as a disk-shaped tool. The rear region of the power tool 1 is formed by a main body 4, which is surrounded by a first, circumferential handle 12, and a second handle 13 for carrying the power tool 1, and a protection frame 14. The protection frame 14 can have two lateral L-shaped structures 16, which are connected to one another by connecting webs (not depicted). Operating switches 21 and switch-on locks 30 are provided on the upper handle 13. For the purposes of the invention, it is preferred that the second handle 13 forms an overlap 17, i.e. a region which projects beyond the rear side 9 of the main body 4 of the power tool 1. The main body 4 of the power tool 1 can be surrounded by a housing 6. The power tool has a motor 5, which is surrounded by a separate motor housing 22.

Figure 2:
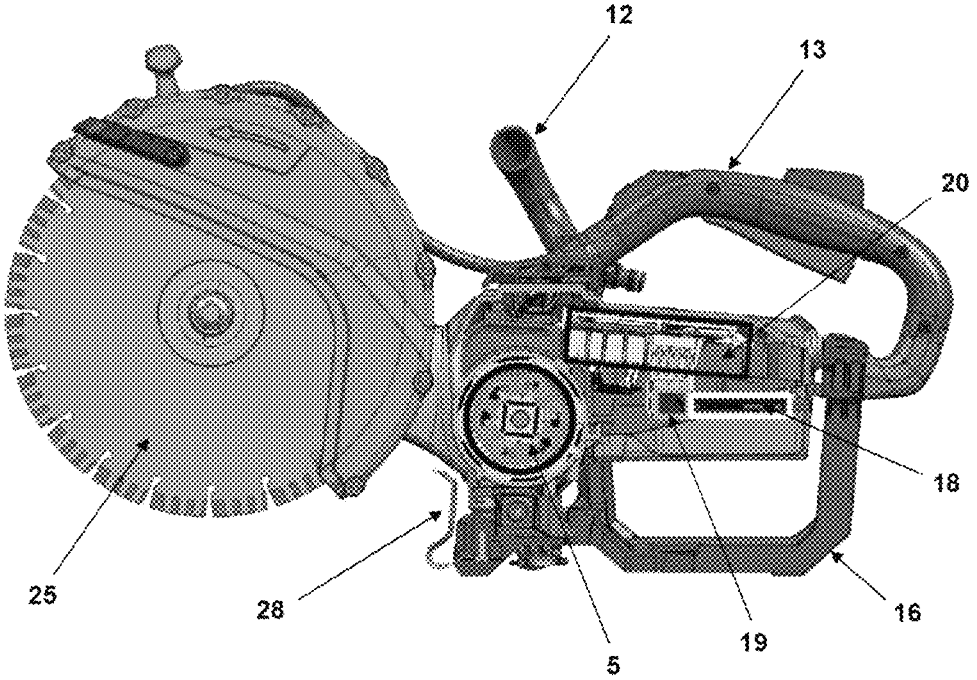
FIG. 2 shows a side view of a preferred configuration of the power tool without rechargeable batteries
Figure 2:
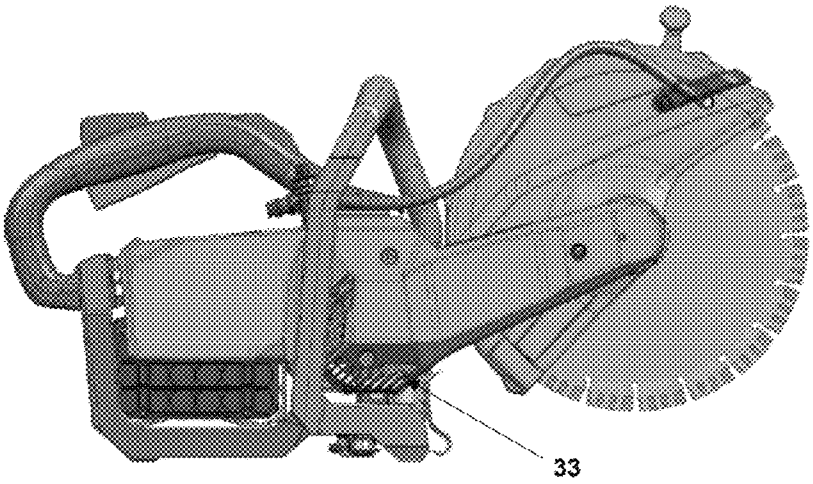

Air inlets 29 are provided on the rear side 9 of the main body 4 of the power tool 1. These are openings through which air can be sucked into the interior of the power tool 1. The air sucked in or the air flow 35 caused by the suction is used to cool various components of the power tool 1, in particular for cooling a carrier unit 32, which has electronics 20 of the power tool 1 and is designed to receive these electronics 20. In addition, the air flow 35 cools a motor connector 34, the motor 5 and the motor housing 22 of the power tool 1. The motor 5 is preferably a brushless electric motor, which has a rotor 37 and a stator 38. In the region of the rotor 37 of the motor 5 there is a fan 40, which sucks in the air through the air inlets 29*a*, 29*b* and thus produces the air flow 35. As an energy source, the power tool 1 preferably has two rechargeable batteries 2, 3, above which the air inlets 29*a*, 29*b* are arranged. For their part, the rechargeable batteries 2, 3 are situated in a first receiving space 7 and a second receiving space 8 within the main body 4 of the power tool 1. The rechargeable batteries 2, 3 are connected to the power tool 1 or the electronics 20 of the power tool 1 via contacts 19 and interfaces 18. One possible arrangement of the contacts 19 and interfaces 18 is illustrated in FIG. 2. In addition, FIG. 1 shows a state of charge indicator 31, which is arranged on the rear side 9 of the power tool 1 and by means of which a state of charge of the rechargeable batteries 2, 3 can be indicated.

Figure 6:
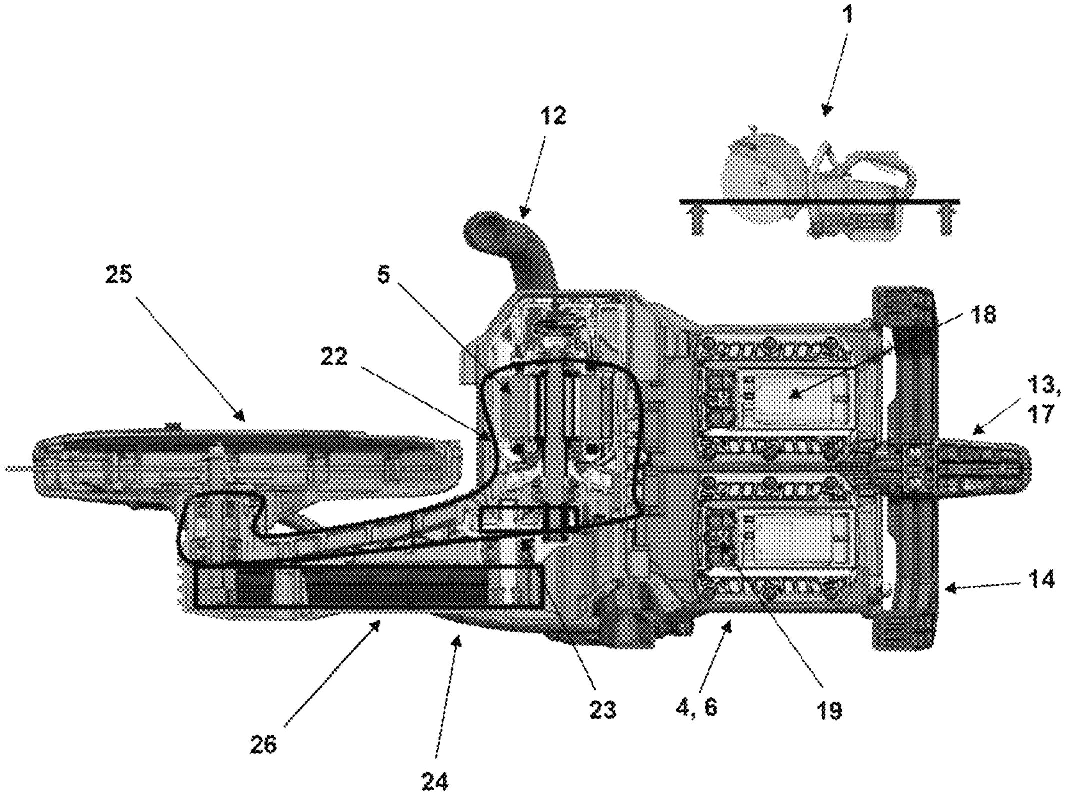
FIG. 6 shows a view of an underside of a preferred configuration of the power tool

FIG. 2 shows a side view of a preferred configuration of the power tool 1 without rechargeable batteries 2, 3. The electronics 20 of the power tool 1 are arranged above the interface 18 and above the contacts 19 for the rechargeable batteries 2, 3. Provision is furthermore made for the electronics 20 to be situated in spatial proximity to the rechargeable batteries 2, 3 in order to keep transmission and communication paths short. Also shown in FIG. 2 is the motor 5 of the power tool 1, which is arranged in a front region of the main body 4 of the power tool 1. The motor 5 has an axis which is formed substantially orthogonally to a longitudinal axis of the power tool 1, which extends centrally within the power tool 1. In other words, the axis of the motor 5 of the power tool 1 is preferably perpendicular to the longitudinal axis of the power tool 1. For the purposes of the invention, this arrangement is described by the wording that the motor 5 of the power tool 1 is oriented transversely to the rechargeable batteries 2, 3 of the power tool 1. In practice, the motor axis projects out of the plane of the image in FIG. 2, and the position of the motor axis is also illustrated in FIG. 6.

The electronics 20 of the power tool 1 are preferably received by a carrier unit 32, which has a slope angle of 3 to 5 degrees. The rechargeable batteries 2, 3, in contrast, are arranged are without sloping in the power tool 1. The carrier unit 32 can preferably also comprise the contacts 19 and interfaces 18 and thus establish the connection between the rechargeable batteries 2, 3 and the power tool 1. Moreover, the carrier unit 32 has heat sinks 36, past which the air flow 35 flows in order to cool the power tool components. These heat sinks 36 of the carrier unit 32 are illustrated particularly in FIG. 4.

In a lower region, FIG. 2 shows the other side of a preferred configuration of the power tool 1. In particular, the lower region of FIG. 2 shows the air outlet 33, from which the spent air used for cooling the components of the power tool 1 can be expelled. In particular, the air outlet 33 is formed by air slits, which may be situated in the region of a transmission 23 of the power tool 1. By virtue of the arrangement of the air outlet 33, unwanted swirling of dust is avoided since the air outlet 33 is arranged precisely facing away from a working region of the power tool 1.

Figure 3:
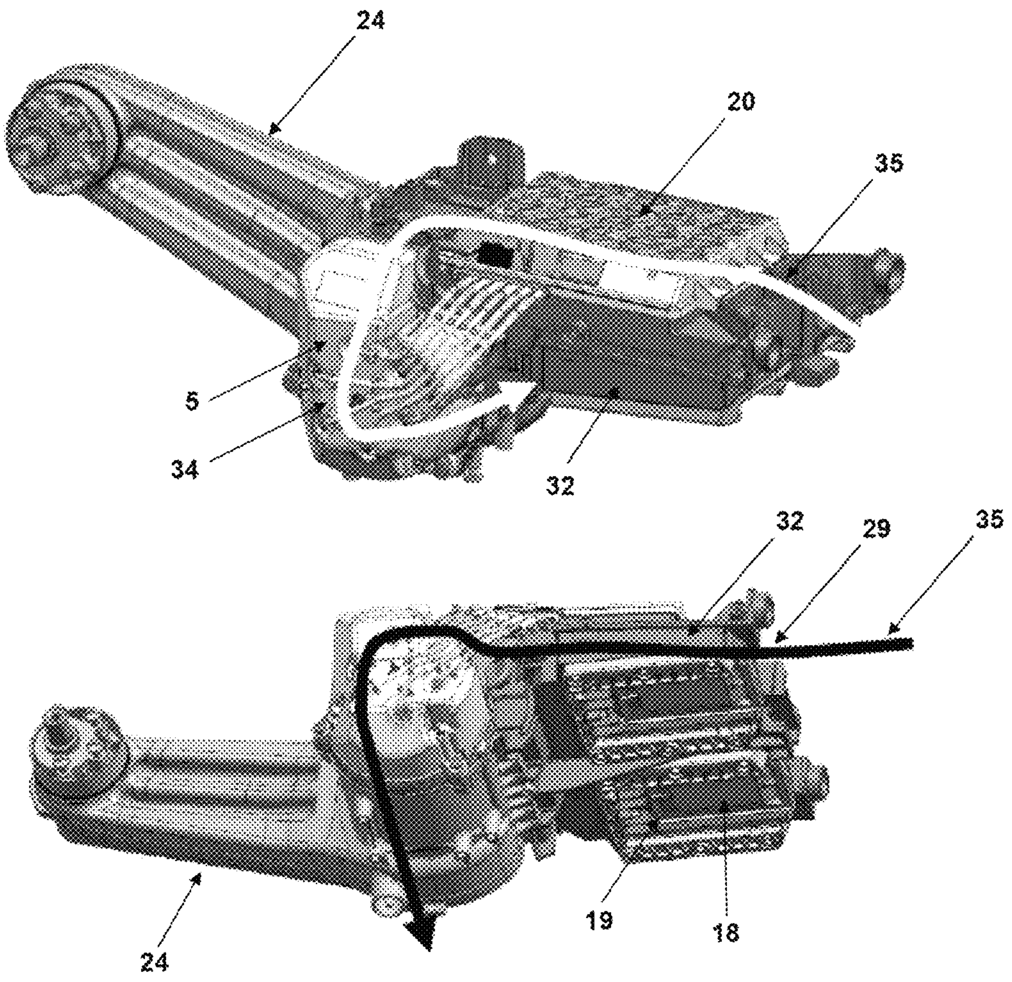
FIG. 3 shows a view of a preferred configuration of an internal functional unit of components of the power tool with the air flow for component cooling indicated

FIG. 3 shows a view of a preferred configuration of an internal functional unit of components of the power tool 1 with the air flow 35 for cooling the components of the power tool 1 indicated. In particular, FIG. 3 shows the cutting arm 24 of the power tool 1 and a unit which is preferably capable of functioning independently and comprises the motor 5, the electronics 20, the transmission 23, the interfaces 18 and the contacts 19. It can be clearly seen in FIG. 3 that the electronics 20 of the power tool 1 are installed in a suspended manner. The motor connector 34 is arranged in the region of the motor 5 of the power tool 1, wherein leads connect the motor connector 34 to the electronics 20. To allow the internal functional unit to be illustrated better, the rechargeable batteries 2, 3 are not illustrated in FIG. 3. In both of the partial figures of FIG. 3, the manually drawn arrow indicates a possible path of the cooling air flow 35 through the power tool 1. For the purposes of the invention, it is preferred that the air flow 35 first flows through and cools the carrier unit 32 with the electronics 20, then the motor connector 34, then the motor 5 and subsequently the motor housing 22.

The air sucked in which forms the air flow 35 is sucked in through the air inlets 29*a*, 29*b* (see, e.g., FIG. 1) and discharged back into the environment of the power tool 1 through the air outlet 33 (see, e.g., FIG. 2). The air flow 35 which is used to cool the power tool components is produced by a reduced pressure which, in turn, is produced by a fan 40 (see, e.g., FIG. 5). The fan 40 is situated in the region of the rotor 37 of the motor 5 of the power tool 1, as illustrated, in particular, in FIG. 5. For the purposes of the invention, it is preferred that the motor 5 is surrounded by a separate motor housing 22, and therefore the proposed power tool 1 comprises essentially two housings, namely the housing 22 of the motor 5 and the housing 6 of the main body 4 of the power tool 1.

The lower part of FIG. 3 allows a view of the underside of the carrier unit 32, which comprises the contacts 19 and interfaces 18 for connecting the power tool 1 to the rechargeable batteries 2, 3. The rechargeable batteries 2, 3 are each arranged in a receiving space 7, 8, wherein each rechargeable battery 2, 3 or each receiving space 7, 8 is allocated a contact region 19 and an interface region 18 for connecting a respective rechargeable battery 2, 3 to the power tool 1.

Figure 4:
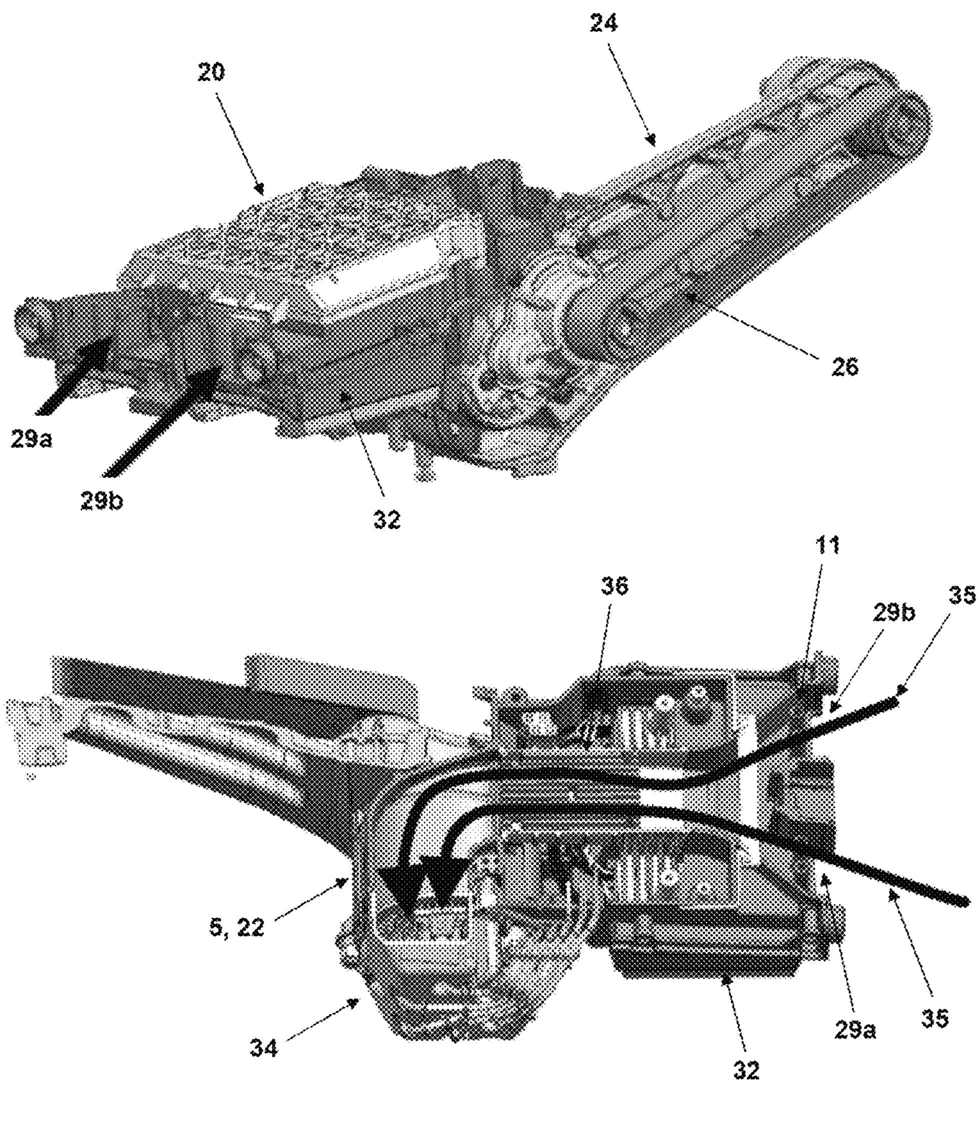
FIG. 4 shows a view of a preferred configuration of an internal functional unit of components of the power tool with the air flow for component cooling indicated

FIG. 4 shows an overview of a preferred configuration of the internal functional unit of the components of the proposed power tool 1. The air flow 35 for component cooling and the path thereof through the power tool 1 are indicated, in particular, in the lower area of FIG. 4. The air flow 35 is sucked into the power tool 1 through the air inlets 29*a*, 29*b*. The air inlets 29*a*, 29*b* are situated, in particular, between the carrier unit 32 and the electronics 20 of the power tool 1. The slope of the carrier unit 32 is clearly visible in FIG. 4. The right-hand area of the upper half of FIG. 4 illustrates the cutting arm 24 of the power tool 1 as well as the drive means 26 by means of which the movement of the motor 5 of the power tool 1 is transmitted to the tool 25. The transmission 23 and the drive means 26—here a belt—are preferably arranged in the preferably separate motor housing 22 of the power tool 1.

A section through the carrier unit 32 and a section through the heat sinks 36 of the electronics 20 are illustrated in the lower area of FIG. 4. The air is sucked in through the air inlets 29*a*, 29*b* and forms a cooling air flow 35, which flows through the heat sinks 36 of the electronics 20 of the power tool 1 and in this way cools the electronics 20. The air flow 35 is guided by internal guidance processes from the carrier 32 and the heat sinks 36 into the region of the motor connector 34 and on into the motor 5 in order to cool these.

Figure 5:
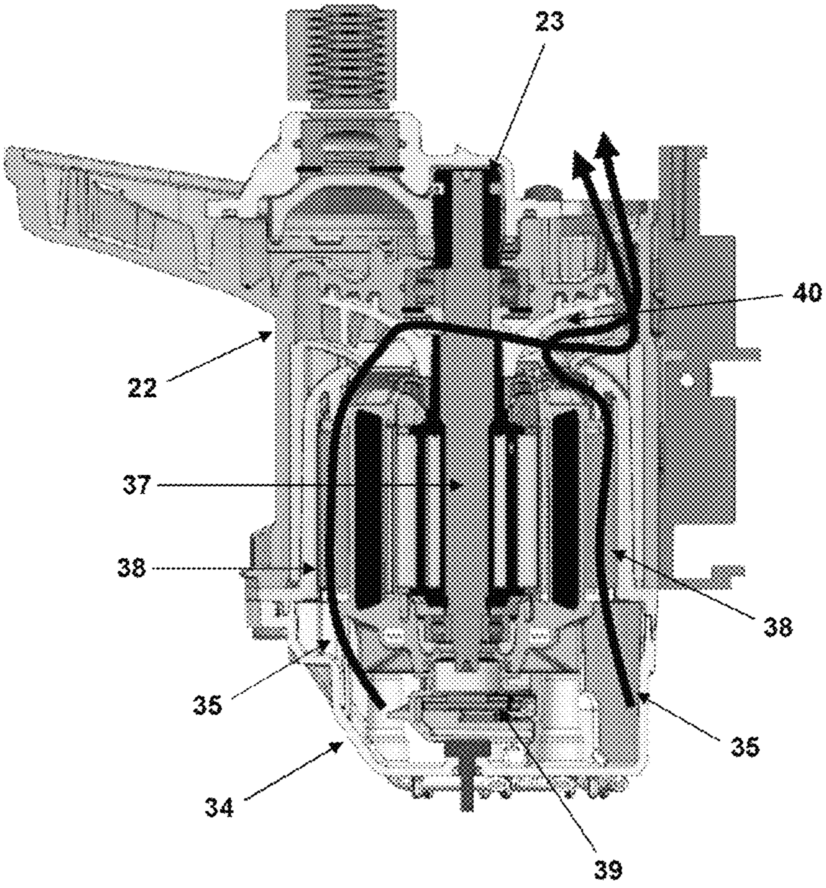
FIG. 5 shows a sectional illustration of a preferred configuration of the transmission and the motor of the power tool with the air flow for component cooling indicated

FIG. 5 a shows sectional illustration of a preferred configuration of the transmission 23 and the motor 5 of the proposed power tool 1. In particular, the cooling air flow 35, by means of which the components of the power tool 1 can be cooled, is also indicated in FIG. 5. For the purposes of the invention, it is preferred that the air flow 35 is guided to the fan 40 along the outside of the stator 38. From there, it is guided onward past the motor housing 22 and the transmission 23 in the direction of the air outlet 33, where the spent air is expelled from the power tool 1. The air flow 35 enters the unit illustrated in FIG. 5 comprising the motor 5 and the transmission 23 through the motor connector 34. In a manner known per se, the motor 5 has a rotor 37 and a stator 38, which can be arranged as illustrated in FIG. 5. An enclosure 39 of the rotor 37 of the motor 5 of the power tool is illustrated in the lower area of FIG. 5. The enclosure 39 can be formed by a seal or can comprise a seal. The enclosure 39 protects the rotor 37, in particular against dust and moisture. In particular, the enclosure 39 also seals off the rotor 37 with respect to the air flow 35. It is thereby advantageously possible to increase the service life of the bearings of the rotor 37. The air flow 35 flows past the stator 38 on the outside and in this way cools the stator 38. The air flow 35 is then expelled at the motor housing 22, next to the transmission 23 of the power tool 1.

FIG. 6 shows the view of an underside of a preferred configuration of the proposed power tool 1. The motor 5 is arranged in a front region of the main body 4 of the power tool 1. It is surrounded by a motor housing 22. The movement which is produced by the motor 5 of the power tool 1 is transmitted to the tool 25 of the power tool 1 via drive means 26. Arranged between the drive means 26 and the motor 5 is a transmission 23 of the power tool, which is preferably likewise arranged within the motor housing 22. The drive means 26 can comprise a belt or can be formed by such a belt. The cutting disk 25 of the cut-off grinder 1 is connected to the main body 4 of the cut-off grinder 1 by a cutting arm 24, wherein the belt for transmitting the movement of the motor 5 of the cut-off grinder runs at least partially parallel to the cutting arm 24. The rechargeable batteries 2, 3 are not illustrated in FIG. 6. By virtue of their omission, it is possible to see the battery interface 18 and the connecting contacts 19, which connect the rechargeable batteries 2, 3 to the power tool electrically or electronically.

LIST OF REFERENCE SIGNS

1 Power tool
2 First rechargeable battery
3 Second rechargeable battery
4 Main body
5 Motor
6 Housing
7 First receiving space
8 Second receiving space
9 Rear side of the main body
10 Upper side of the housing
11 Domes at the air inlet
12 First, circumferential handle
13 Second, upper handle
14 Protection frame
16 L-shaped structure
17 Overlap
18 Interface between rechargeable batteries and power tool
19 Contacts between rechargeable batteries and power tool
20 Electronics of the power tool
21 Operating switch
22 Motor housing
23 Transmission
24 Cutting arm
25 Tool or cutting disk
26 Drive means or belt
27 Front side of the housing
28 Guard plate

29 Air outlet
30 Switch-on lock
31 State of charge indicator
32 Carrier unit
33 Air outlet
34 Motor connector
35 Air flow
36 Heat sink
37 Rotor
38 Stator
39 Seal or enclosure
40 Fan

What is claimed is:

1. A power tool comprising:
an air cooling system including a fan;
a carrier unit with electronics;
a motor connector;
a motor having a stator and a rotor; and
a motor housing;
the fan being arranged on the rotor and configured to produce a reduced pressure so that an air flow produced by the reduced pressure cools the carrier unit, the motor connector, the motor having the stator and the rotor, and the motor housing of the power tool;
wherein the carrier unit has at least one interface for a rechargeable battery.

2. The power tool as recited in claim 1 wherein the air flow cools in sequence the carrier unit with electronics, the motor connector, the motor having the stator and the rotor, and the motor housing.

3. The power tool as recited in claim 1 wherein the electronics have at least one heat sink.

4. The power tool as recited in claim 3 wherein the electronics are installable in a suspended manner within the power tool.

5. The power tool as recited in claim 1 wherein the power tool has two rechargeable batteries as energy sources.

6. The power tool as recited in claim 1 further comprising a first, circumferential handle, and a second, upper handle and a protection frame for protecting a main body of the power tool.

7. The power tool as recited in claim 1 further comprising air inlets for sucking in air, the air inlets being arranged on a rear side of a main body of the power tool.

8. The power tool as recited in claim 7 wherein the air inlets are on opposite sides of an upper handle of the power tool.

9. The power tool as recited in claim 7 wherein the air inlets have domes to protect the air inlets from penetration of dirt or dust particles.

10. The power tool as recited in claim 1 further comprising a first air inlet arranged above a first rechargeable battery, and a second air inlet arranged above a second rechargeable battery.

11. The power tool as recited in claim 10 wherein the first and second air inlets are on opposite sides of an upper handle of the power tool.

12. The power tool as recited in claim 10 wherein the first and second air inlets have domes to protect the first and second air inlets from penetration of dirt or dust particles.

13. The power tool as recited in claim 1 further comprising an air outlet arranged in the region of a transmission of the power tool.

14. The power tool as recited in claim 1 wherein the rotor has an enclosure for protection from dust.

15. A method for cooling components of a power tool, the method comprising:
a) providing the power tool as recited in claim 1;
b) producing a reduced pressure via the fan, thereby causing an air flow within the power tool; and
c) cooling the carrier unit with electronics, the motor connector, the motor having the stator and the rotor, and the motor housing via the air flow produced in step b).

16. The method as recited in claim 15 wherein the cooling takes place in the sequence of the carrier unit with electronics, the motor connector, the motor having the stator and the rotor, and the motor housing.

17. A power tool comprising:
an air cooling system including a fan;
a carrier unit with electronics;
a motor connector;
a motor having a stator and a rotor; and
a motor housing;
the fan being arranged on the rotor and configured to produce a reduced pressure so that an air flow produced by the reduced pressure cools the carrier unit, the motor connector, the motor having the stator and the rotor, and the motor housing of the power tool;
wherein the power tool has two rechargeable batteries as energy sources.

18. A power tool comprising:
an air cooling system including a fan;
a carrier unit with electronics;
a motor connector;
a motor having a stator and a rotor;
a motor housing; and
a first, circumferential handle, and a second, upper handle and a protection frame for protecting a main body of the power tool;
the fan being arranged on the rotor and configured to produce a reduced pressure so that an air flow produced by the reduced pressure cools the carrier unit, the motor connector, the motor having the stator and the rotor, and the motor housing of the power tool.

19. A power tool comprising:
an air cooling system including a fan;
a carrier unit with electronics;
a motor connector;
a motor having a stator and a rotor;
a motor housing; and
a first air inlet arranged above a first rechargeable battery, and a second air inlet arranged above a second rechargeable battery;
the fan being arranged on the rotor and configured to produce a reduced pressure so that an air flow produced by the reduced pressure cools the carrier unit, the motor connector, the motor having the stator and the rotor, and the motor housing of the power tool.

20. The power tool as recited in claim 19 wherein the first and second air inlets are on opposite sides of an upper handle of the power tool.

21. The power tool as recited in claim 19 wherein the first and second air inlets have domes to protect the first and second air inlets from penetration of dirt or dust particles.

22. A power tool comprising:
an air cooling system including a fan;
a carrier unit with electronics;
a motor connector;
a motor having a stator and a rotor;
a motor housing; and
air inlets for sucking in air, the air inlets being arranged on a rear side of a main body of the power tool;
the fan being arranged on the rotor and configured to produce a reduced pressure so that an air flow produced by the reduced pressure cools the carrier unit, the motor connector, the motor having the stator and the rotor, and the motor housing of the power tool;

wherein the air inlets are on opposite sides of an upper handle of the power tool.

23. A power tool comprising:

an air cooling system including a fan;

a carrier unit with electronics;

a motor connector;

a motor having a stator and a rotor;

a motor housing; and air inlets for sucking in air, the air inlets being arranged on a rear side of a main body of the power tool;

the fan being arranged on the rotor and configured to produce a reduced pressure so that an air flow produced by the reduced pressure cools the carrier unit, the motor connector, the motor having the stator and the rotor, and the motor housing of the power tool;

wherein the air inlets have domes to protect the air inlets from penetration of dirt or dust particles.

* * * * *